United States Patent
Packman et al.

(10) Patent No.: US 6,321,505 B1
(45) Date of Patent: Nov. 27, 2001

(54) METAL DOOR AND METHOD OF PRODUCTION

(75) Inventors: Barry Kenneth Packman; Steven Knight, both of Kent (GB)

(73) Assignee: Ingersoll-Rand Architectural Hardware Group Limited, Birmingham (GB)

( * ) Notice: Subject to any disclaimer, the term of this patent is extended or adjusted under 35 U.S.C. 154(b) by 0 days.

(21) Appl. No.: 09/579,318

(22) Filed: May 25, 2000

(30) Foreign Application Priority Data

May 28, 1999 (GB) .................................................. 9912568

(51) Int. Cl.$^7$ ........................................................ E06B 3/76
(52) U.S. Cl. .................... 52/784.13; 52/656.4; 52/792.1; 29/897.32
(58) Field of Search ............................ 52/784.12, 784.13, 52/792.1, 792.11, 801.12, 656.2, 656.4, 656.3, 656.7; 29/897.32

(56) References Cited

U.S. PATENT DOCUMENTS

| | | |
|---|---|---|
| 1,801,080 | 4/1931 | Hart et al. . |
| 1,873,417 | 8/1932 | Jones . |
| 2,297,609 | 9/1942 | Clark et al. . |
| 2,433,767 * | 12/1947 | Kuettel ................................ 52/784.12 |
| 2,638,187 * | 5/1953 | Tate ...................................... 52/792.1 |
| 2,707,535 | 5/1955 | Weimer . |
| 2,787,345 * | 4/1957 | Soubier et al. ..................... 52/784.12 |
| 3,359,699 | 12/1967 | Jackson . |
| 3,786,613 | 1/1974 | Shepheard . |
| 3,837,134 | 9/1974 | DiFazio . |
| 3,924,377 | 12/1975 | Gill . |
| 4,183,393 | 1/1980 | Bailey . |
| 4,344,256 | 8/1982 | King . |
| 4,441,301 | 4/1984 | Benson . |
| 4,583,796 | 4/1986 | Nakajima et al. . |
| 4,819,383 | 4/1989 | McKann et al. . |
| 4,896,458 | 1/1990 | McKann et al. . |
| 4,922,674 | 5/1990 | Thorn . |
| 5,448,872 | 9/1995 | Thompson et al. . |
| 5,490,361 | 2/1996 | Gingras . |
| 5,570,560 | 11/1996 | Thompson et al. . |
| 5,720,142 | 2/1998 | Morrison . |

FOREIGN PATENT DOCUMENTS

| | | |
|---|---|---|
| 3127009 | 7/1981 | (DE) . |
| 3706109 | 9/1988 | (DE) . |
| 0543371 | 9/1922 | (FR) . |
| 0773493 | 11/1934 | (FR) . |
| 0825622 | 3/1938 | (FR) . |
| 1064023 | 5/1954 | (FR) . |
| 1358524 | 12/1964 | (FR) . |
| 2497866 | 1/1982 | (FR) . |
| 2564131 | 1/1985 | (FR) . |
| 351888 | 7/1931 | (GB) . |
| 471258 | 3/1936 | (GB) . |
| 519438 | 9/1938 | (GB) . |
| 519439 | 9/1938 | (GB) . |
| 630237 | 10/1947 | (GB) . |
| 838891 | 2/1958 | (GB) . |
| 1152943 | 8/1966 | (GB) . |
| 1309789 | 12/1989 | (JP) . |
| 4083081 | 3/1992 | (JP) . |
| 5332070 | 12/1993 | (JP) . |
| WO 8604108 | 7/1986 | (WO) . |
| WO 8803983 | 6/1988 | (WO) . |

* cited by examiner

Primary Examiner—Michael Safavi
(74) Attorney, Agent, or Firm—Michael Best & Friedrich LLP

(57) ABSTRACT

A door comprising two metal panels and an internal core structure. The panels have their edges formed around a perimeter sub-frame of channel construction, the base of the channel being internally adjacent the respective edge of the door. Opposing edges of the panels are seam welded together to provide a flush finish, and the base of the channel is apertured to act as a heat sink and to allow weld gas to escape.

13 Claims, 3 Drawing Sheets

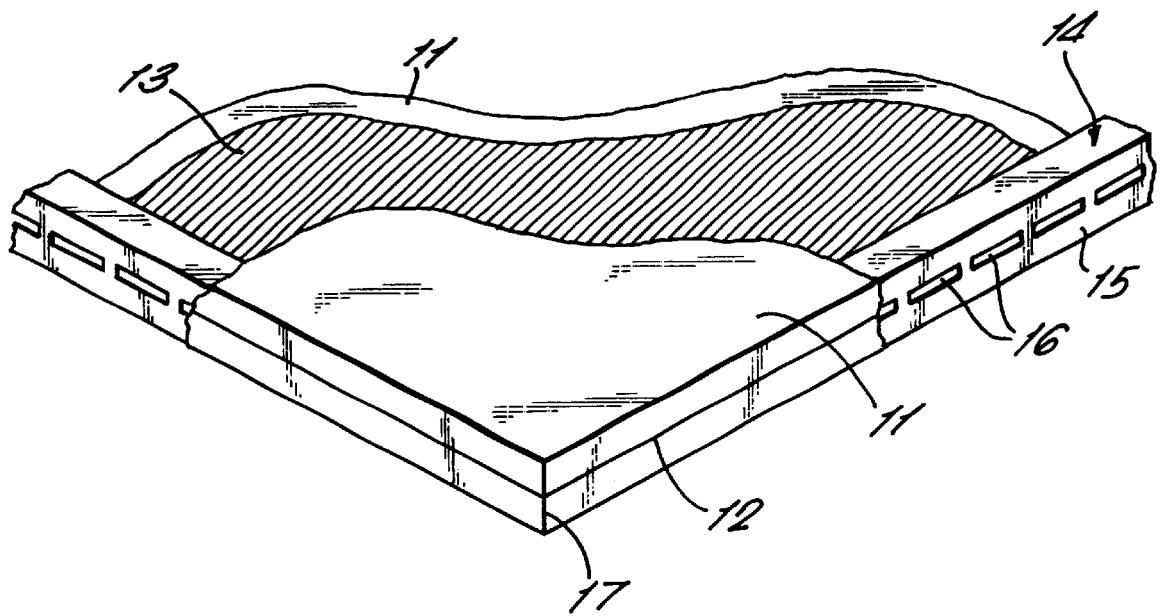

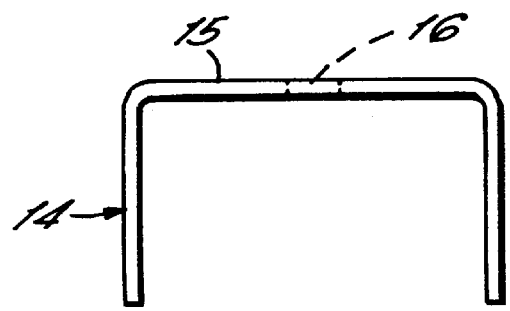
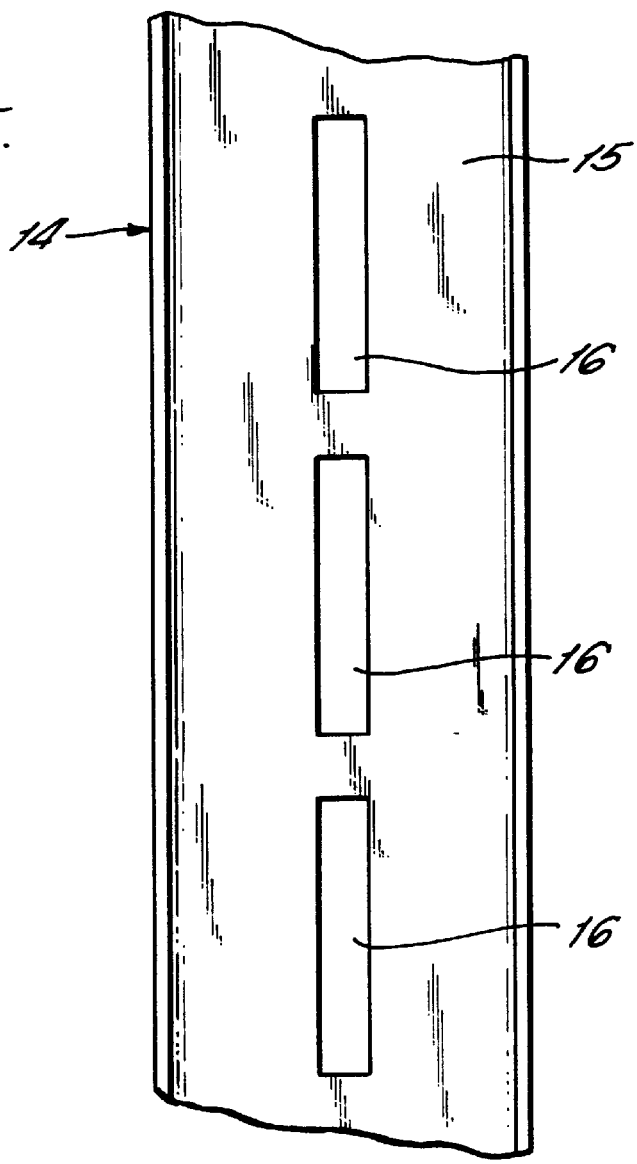

METAL DOOR AND METHOD OF PRODUCTION

This invention relates to a metal door. The invention also relates to a method of producing a metal door.

SUMMARY OF THE INVENTION

In one aspect of the present invention, this is accomplished by providing a door comprising: two metal panels; and a perimeter sub-frame, the sub-frame including a means for permitting weld gas to escape, the metal panels having their edges formed about the outside of the sub-frame.

An object of the invention is to provide a metal door having clean, flush edges capable of use in clean room applications for the electronic and pharmaceutical industries, as well as in general installations of other kinds.

According to the invention there is provided a door comprising two metal panels and an internal core structure, the panels having their edges formed around a perimeter sub-frame, wherein opposing edges of the panels are seam welded together to provide a flush finish.

Preferably the perimeter sub-frame is of a channel construction, the base of the channel being internally adjacent the respective edge of the door. It is also preferred that the base of the channel is apertured to act as a heat sink and to allow weld gases to escape. The apertures are preferably slots extending longitudinally of the base of the channel along its length. Preferably the door panels are of steel. In the preferred embodiment the door panels have a flush external surface.

The invention also provides a method of producing a metal door comprising constructing a perimeter sub-frame, assembling together the sub-frame, a core structure and two door panels, press forming the panels to the side edges of the sub-frame, and welding the adjacent door panel edges to provide a flush finish. Preferably the method includes welding the vertical seam at each corner of the door prior to welding the door panel edges longitudinally.

The foregoing and other aspects will become apparent from the following detailed description of the invention when considered in conjunction with the accompanying drawing figures.

BRIEF DESCRIPTION OF THE DRAWING FIGURES

FIG. 3 is a partial cut-away view of one corner of the door of FIG. 1; and

FIGS. 4 and 5 show the internal perimeter sub-frame of the door of FIG. 1 in end and front elevation respectively.

DETAILED DESCRIPTION

Figure 1:
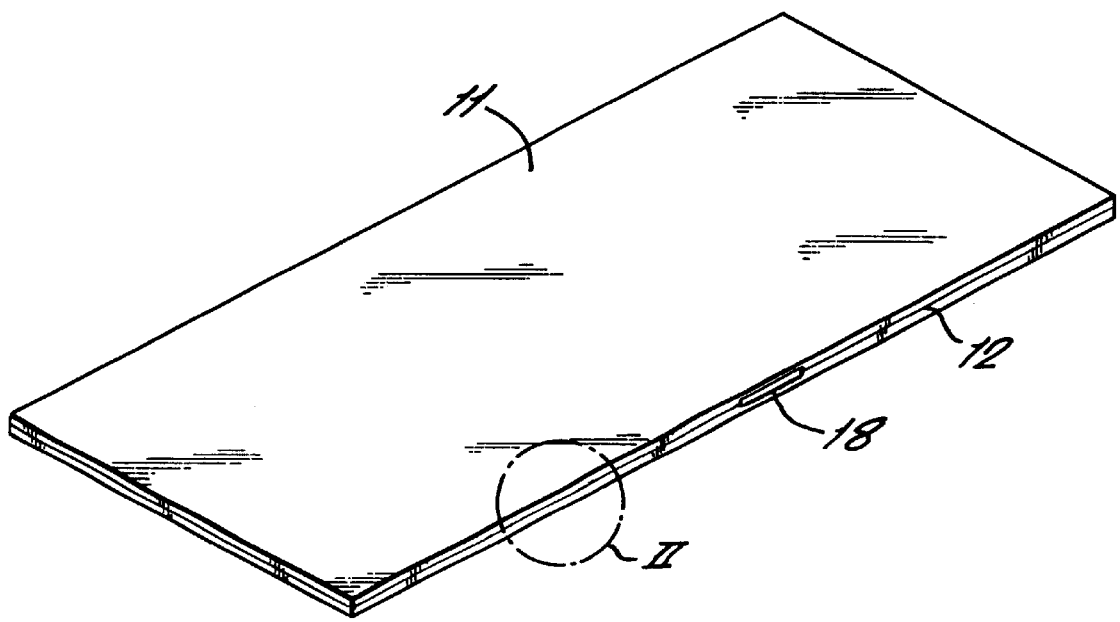
FIG. 1 is a perspective view of a steel door.
Figure 2:
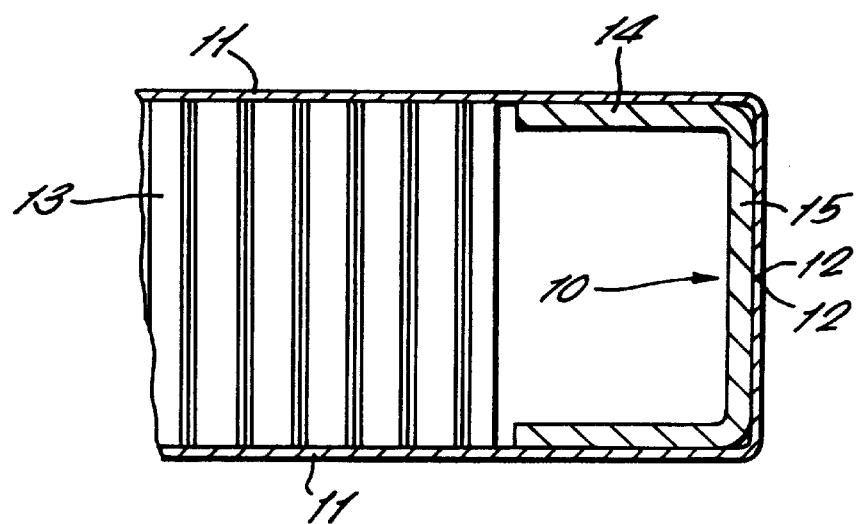
FIG. 2 is a detailed section of part of the door of FIG. 1, marked II.

With reference to the drawings, a steel door comprises a four sided, internal perimeter sub-frame 10 welded at its corners. Two flush door panels 11 are wrapped around the sub-frame 10 with the adjacent edges 12 of the panels at least substantially abutting each other (see FIG. 2). The hollow door encloses a core 13 of known construction required to meet specific door characteristics. In this embodiment, the sub-frame 10 is formed of 1.6 mm thick channel 14 and the panels 11 are each 1.2 mm thick. The core 13 is bonded to the panels 11 by an adhesive utilising a heated press to achieve the correct pressure and cure time.

The channel 14 has a base width which corresponds to the required door thickness and a leg dimension, in this embodiment of 28 mm. The base 15 of the channel 14 is punched with a series of longitudinally extending slots 16 along its length, for example, 35 mm long×6 mm wide at 44 mm centres. Alternatively, the base of the channel may be otherwise apertured.

The door panels 11 are CNC punched to size and press formed to all four side edges of the sub-frame 10 so as to allow only a small gap, for example, a maximum 0.5 mm, and no overlap between the adjacent door panel edges, and a tight fit over the sub-frame when assembled. On assembly of the door panels 11 and the sub-frame 10, the vertical seam 17 at each corner is hand welded and cleaned flush.

The door is then loaded into a welding machine whereby the panels 11 are clamped and their abutting edges 12 are welded longitudinally together and finished flush around all four side edges. The slots 16 or other apertures act as a heat sink and allow weld gases to escape. The welding is automatically discontinued where necessary, e.g. at position 18, for door ironmongery (not shown) to be fitted subsequently.

The hollow steel door is thereby fully welded without distortion and to maintain the door flatness. Its flush edges render the door suitable for use in clean room applications for the electronic and pharmaceutical industries. In other more general installations the door panels may be shaped on their major surfaces, if desired, but the door construction is otherwise the same as described above. In each case, there is produced a steel door of aesthetic quality in a speedy and repeatable manner.

The invention is not limited to the specific details of the embodiment described above. For example, the door panels may be formed of other metal, e.g. aluminium or stainless steel.

Having described the invention, what is claimed is:

1. A door comprising:
    a sub-frame having a base surface and defining first and second spaced apart faces and a given perimeter;
    first and second external panels covering the first and second faces, the first and second panels abutting along the sub-frame base surface to define a seam substantially about the perimeter;
    a weld bead adjoining the first and second panels along the perimeter seam to close the perimeter seam and thereby complete a substantially continuous external surface enclosing the sub-frame; and
    the sub-frame base surface having at least one aperture therethrough in alignment with the perimeter seam such that the perimeter seam crosses the aperture, the aperture permitting the passage of weld gas.

2. The door of claim 1 wherein the first and second external panels are of an equal, given thickness and the weld bead is finished to the given thickness such that the panels and the bead define a flush planar surface about the perimeter of the sub-frame.

3. The door of claim 1 wherein the sub-frame has a rectangular configuration with four corners, the panels abutting at each corner to define four corner seams generally perpendicular to the perimeter seam, each corner seam provided with a corner weld bead to close the corner seam.

4. The door of claim 3 wherein the first and second external panels are of an equal, given thickness and the weld bead is finished along the perimeter seam and the corner seams to the given thickness such that the panels and the bead define a flush planar surface about the perimeter of the sub-frame.

5. The door of claim 1 wherein the sub-frame base surface has a plurality of apertures such that passage is permitted along a majority of the perimeter.

6. A method of producing a door comprising the steps of:

assembling a sub-frame having a base surface, first and second spaced apart faces and a given perimeter;

providing the sub-frame with at least one aperture therethrough;

press forming first and second external panels about the first and second faces and the base surface such that the first and second panels abut along the base surface to define a seam substantially about the perimeter and in alignment with the aperture such that the perimeter seam crosses the aperture;

providing a weld bead adjoining the first and second panels along the perimeter seam to close the perimeter seam and thereby complete a substantially continuous external surface enclosing the sub-frame, the aperture permitting the passage of weld gas during the provision of the weld bead.

7. The method of claim 6 wherein the first and second external panels are of an equal, given thickness and the method further comprises the step of finishing the weld bead to the given thickness such that the panels and the bead define a flush planar surface about the perimeter of the sub-frame.

8. The method of claim 6 wherein a plurality of apertures are provided along the base surface such that passage is permitted along a majority of the perimeter.

9. A method of producing a door comprising the steps of:

forming a base surface with at least one aperture therethrough;

assembling the base surface to define a sub-frame having first and second spaced apart faces and a perimeter having a rectangular configuration with four corners;

press forming first and second external panels about the first and second faces and the base surface such that the first and second panels abut along the base surface to define a perimeter seam which extends substantially about the perimeter and in alignment with the aperture such that the perimeter seam crosses the aperture, and a corner seam adjacent to each sub-frame corner, each corner seam extending substantially perpendicular to the perimeter seam; and providing a weld bead adjoining the first and second panels along the perimeter seam and the corner seams to close the perimeter seam and the corner seams and thereby complete a substantially continuous external surface enclosing the sub-frame, the aperture permitting the passage of weld gas during the provision of the weld bead.

10. The method of claim 9 wherein the first and second external panels are of an equal, given thickness and the method further comprises the step of finishing the weld bead along the perimeter seam and the corner seams to the given thickness such that the panels and the bead define a flush planar surface about the perimeter of the sub-frame.

11. The method of claim 9 wherein the corner seams are hand welded.

12. The method of claim 11 wherein the sub-frame and door panels are positioned in a welding machine after the corner seams are hand welded, the welding machine thereafter providing the weld bead along the perimeter seam.

13. The method of claim 9 wherein a plurality of apertures are formed along the base surface such that passage is permitted along a majority of the perimeter.

* * * * *